US012806549B2

(12) United States Patent
Lahn et al.

(10) Patent No.: US 12,806,549 B2
(45) Date of Patent: Nov. 24, 2026

(54) CONCENTRIC DUAL DRUM SCREEN

(71) Applicant: Ovivo Inc., Montreal (CA)

(72) Inventors: Steven J. Lahn, Bountiful, UT (US); Gerald Wayne Howard, Dripping Springs, TX (US)

(73) Assignee: Ovivo Water Inc., Montreal (CA)

( * ) Notice: Subject to any disclaimer, the term of this patent is extended or adjusted under 35 U.S.C. 154(b) by 741 days.

(21) Appl. No.: 18/196,885

(22) Filed: May 12, 2023

(65) Prior Publication Data

US 2024/0009599 A1 Jan. 11, 2024

Related U.S. Application Data

(60) Provisional application No. 63/341,352, filed on May 12, 2022.

(51) Int. Cl.

| | |
|---|---|
| ***B01D 33/11*** | (2006.01) |
| ***B01D 33/067*** | (2006.01) |
| ***B01D 33/46*** | (2006.01) |

(52) U.S. Cl.
CPC ............ *B01D 33/11* (2013.01); *B01D 33/067* (2013.01); *B01D 33/463* (2013.01); *B01D 2201/184* (2013.01)

(58) Field of Classification Search
CPC .... B01D 33/11; B01D 33/067; B01D 33/463; B01D 2201/184; B01D 33/50
USPC ........................................................ 210/295
See application file for complete search history.

(56) References Cited

U.S. PATENT DOCUMENTS 5,433,849 A 7/1995 Zittel
9,511,311 B2 12/2016 Bugg

*Primary Examiner* — Hayden Brewster
(74) *Attorney, Agent, or Firm* — Thomas M. Freiburger

(57) ABSTRACT

A dual drum screen system for wastewater has a first, inner drum positioned within a second, outer drum. Wastewater is filtered first by a filter screen of the inner drum, then by a finer filter screen of the outer drum. Both drums rotate together on a central shaft with a common drive system.

9 Claims, 6 Drawing Sheets

Drum Size:

| | | |
|---|---|---|
| D1 | 36 | in |
| D2 | 60 | in |
| L | ≤ 2/3 | D2 |
| x | 6 | in |
| H | 30 | in |
| H1 | 18.0 | in |

Wetted Area:

| | | |
|---|---|---|
| A1 | 2375 | in2 |
| A2 | 3958 | in2 |
| A2/A1 | 1.67 | |

*ratio is minimized when H = D2/2*

CONCENTRIC DUAL DRUM SCREEN

This application claims benefit of provisional application No. 63/341,352, filed May 12, 2022.

BACKGROUND OF THE INVENTION

The invention concerns wastewater treatment, and in particular is concerned with a drum screen assembly for filtering out particulate matter prior to entry into a treatment process, particularly a biological sewage treatment system. This is especially important upstream of a membrane biological reactor system (MBR).

Dual stage screening is considered the best defense to protect membrane biological reactors (MBR) systems. The problems associated with dual stage screening are primarily the cost and size requirements associated with two separate screens and a grit (screenings) removal system. Serially combining a screen and a finer screen in a single machine reduces the footprint and operating costs.

U.S. Pat. No. 9,511,311 describes a filtration tank with horizontal cylindrical drum screens serially connected on a common longitudinal axis where the incoming water flows inside-out through the first screen, around a dividing wall, then outside-in through the second, finer screen to enter the interior of the second screen before exiting the tank.

The outside-in flow pattern results in the screenings collecting on the outside surface of the second screen. As the drum rotates out of the water the screenings are prone to sloughing off prior to reaching the wash system and collection hopper intended to remove the screenings from the filtration tank. The resulting accumulation of screenings in the filtration tank is detrimental to the performance and maintenance of the screen.

SUMMARY OF THE INVENTION

This invention addresses that problem while further reducing the footprint of the machine by eliminating the dividing wall between the two screens and increasing the diameter of the second screen, such that the first screen can be nested concentrically within the second screen. With the entry to the second screen sealed such that the incoming water flows inside-out through the first screen into the annulus between the cylindrical screens and then continues to flow inside-out through the second, finer screen before exiting the tank, the screenings can be collected on the inside surface of both screens, where they can efficiently be conveyed to the collection hopper by lifts inside the drums.

Increasing the diameter of the second screen relative to the diameter of the first screen also increases the effective filtration area of the second screen. The finer screen is more restrictive to the flow of water due to the smaller openings. Increasing the effective area of the finer screen thus improves the hydraulic performance of the system.

U.S. Pat. No. 5,433,849 describes a dual drum wastewater screen apparatus which includes a first inner screen and a second outer screen. Both screens are wedge wire drum screens, concentrically arranged, with wastewater fed into the inner screen, filtered by that screen and then filtered by the outer screen. Helical scrapers are used to clear the debris collected on the interior of each screen. In the system of the '849 patent the water can overflow out the open ends of the two drums if the wedge wire becomes blinded with debris. Thus, wastewater bypasses the apparatus without any screening. Further, the inflow to the apparatus is a deluge type of water feed. In addition, the drums are supported by outer trunions or drives, rather than being rotatable on a central shaft. Further, the system of the '849 patent does not employ a conventional wastewater and hopper system for transferring the debris out from the drums, but rather the debris is cleared with a relatively complex auger or helix debris removal, providing limitations in performance and maintenance.

A primary object of this invention is to improve the efficiency of structure and operation of a dual drum screen system, and thereby reducing overall footprint of the dual screen apparatus, even beyond that of a serial dual system.

DESCRIPTION OF PREFERRED EMBODIMENTS

Figure 1:
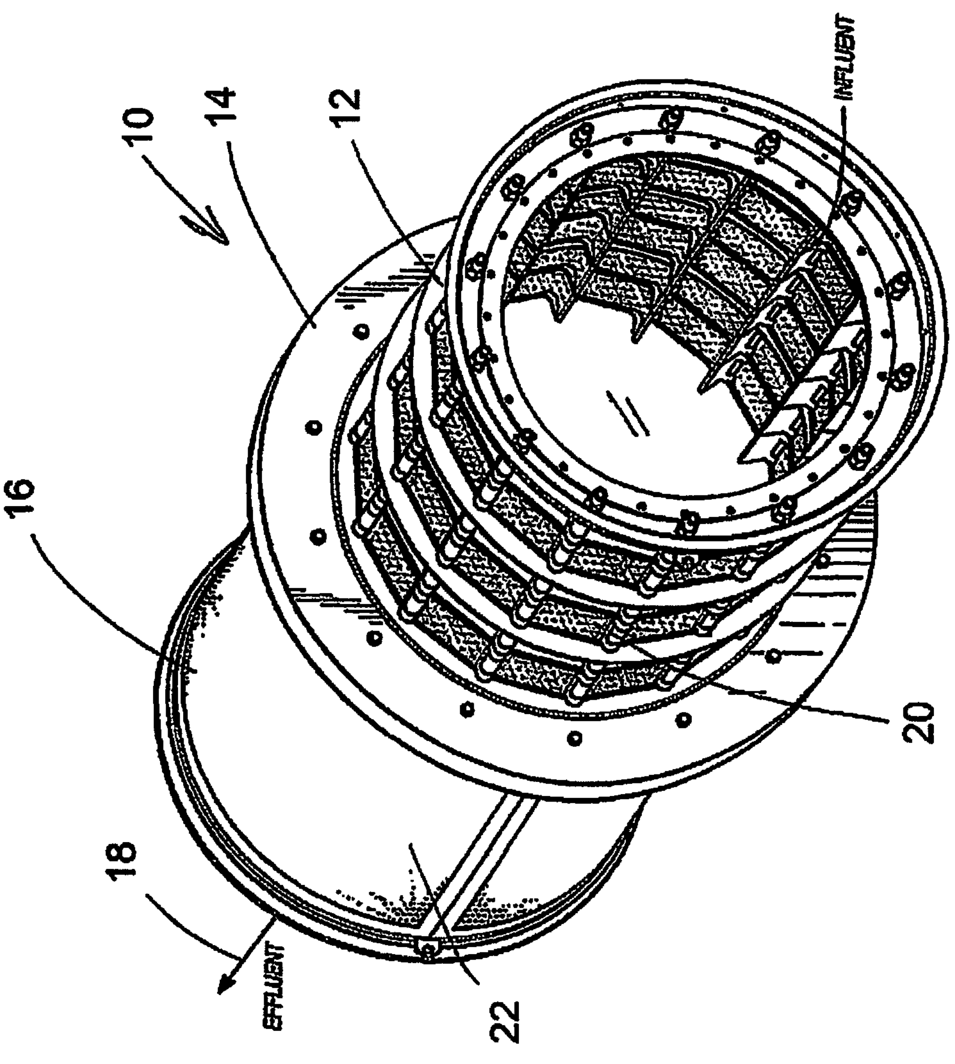
FIG. 1 PRIOR ART
FIG. 1 is a prior art showing in perspective a conventional dual drum screen apparatus in which a primary and a secondary screen are arranged concentrically but in tandem or series.

In the drawings, FIG. 1 shows a prior art coaxial dual screen filtration apparatus in accordance with U.S. Pat. No. 9,511,311. The dual-screen device 10 depicted is to be encased in a tank as explained in the patent, shown particularly in FIGS. 3 and 4 of the patent. Liquid, particularly wastewater, to be filtered enters the smaller-diameter drum screen 12 in the device of FIG. 1. As explained above, the wastewater flows outwardly, inside out through the smaller drum filter 12, to collect on the inside of that screen, then the filtered liquid flows over a divider wall 14 to the outside of the larger-diameter drum screen 16, where it flows outside-in, to collect filtered debris on the outside of that larger drum screen and filtered liquid inside. The effluent filtered wastewater is indicated at 18.

As explained in the patent, the screen 20 of the first drum 12 is a screen with openings of about 3 mm, and the second screen 22 of the drum 16 is of smaller size, ultra-fine screen with opening size of about 1 mm. Disadvantages of this arrangement, including larger footprint, are explained above. In this prior art construction the two drum screens are aligned and coaxial, but not concentric as in the current invention.

Figure 2:
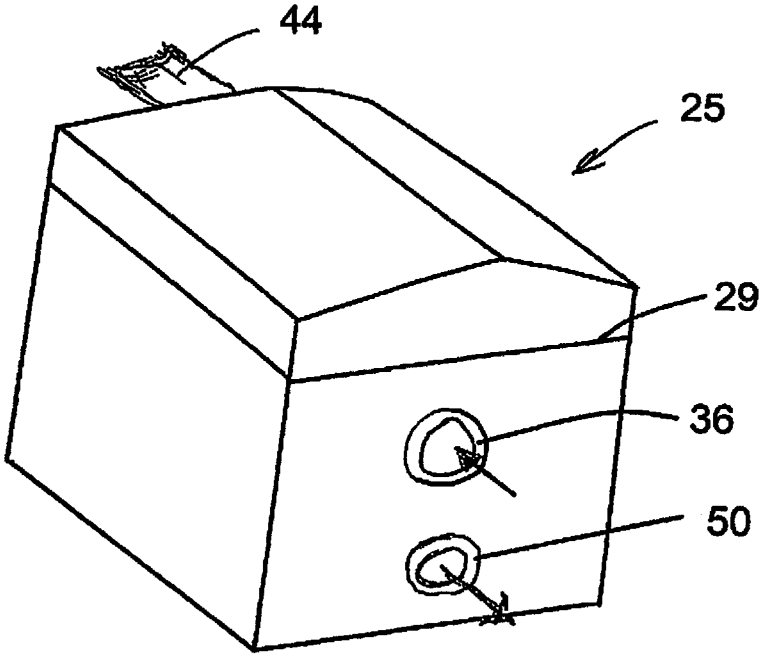
FIG. 2 is a perspective view indicating a preferred embodiment of the invention.
Figure 3:
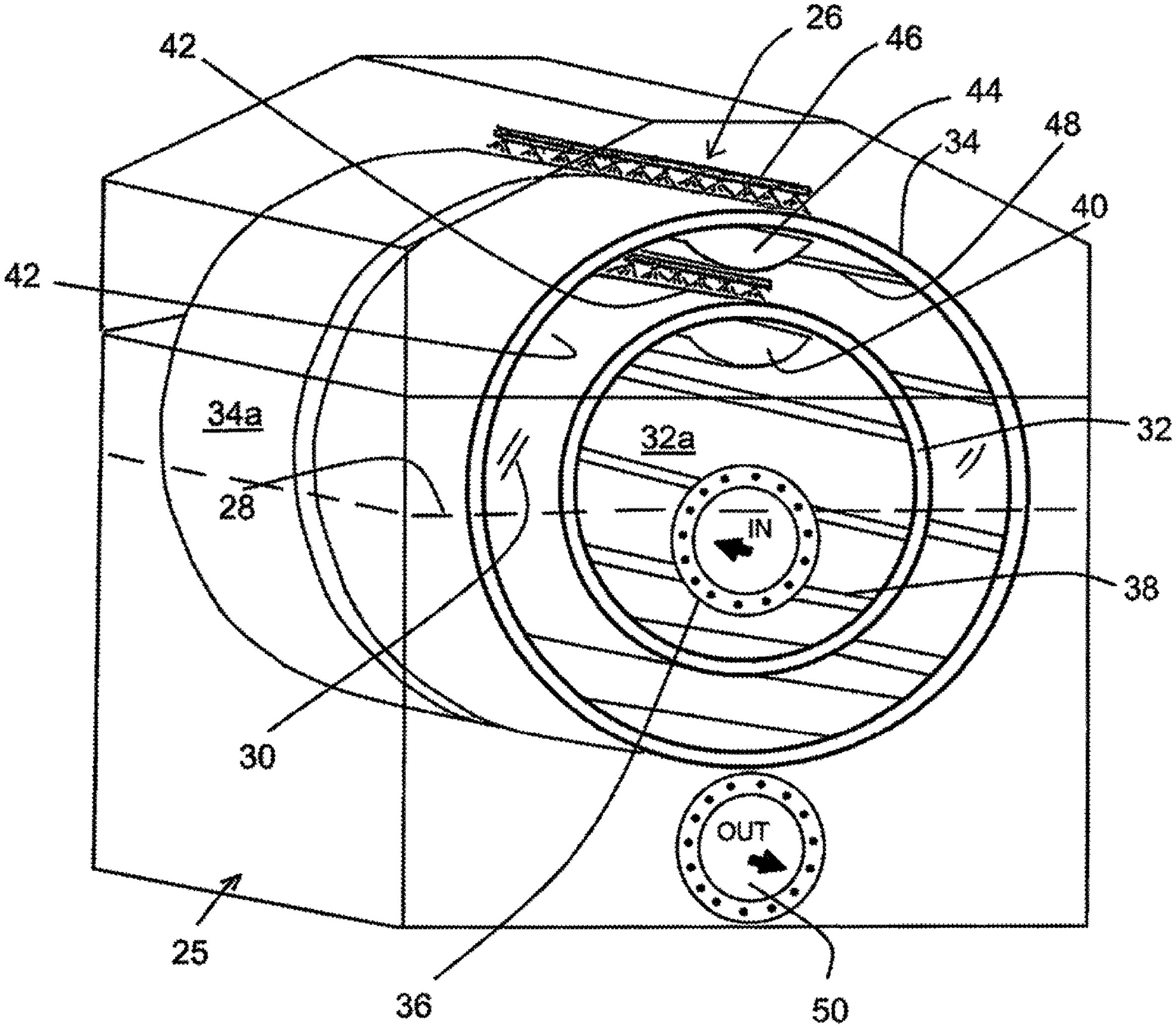
FIG. 3 is a perspective view of the system of the invention with portions shown cut away or transparent, revealing components of the system within a tank.

The invention is depicted in FIGS. 2 and 3. A tank 25 encloses a concentric dual drum screen apparatus 26, a water level within the tank being shown at 28. The drawing is somewhat schematic, and indicates that the tank can be openable at 29 for access to the interior. A wall is indicated by shade lines 30 but not shown in the drawing, this wall being sealed against the near ends of the two cylindrical drum screens, i.e. the inner drum screen 32 and the outer drum screen 34. A seal such as a wiper seal can be used. The wall 30 can be inner side of the tank's wall, or it could be a separate wall within the tank but sealed against the ends of the two cylinders 32 and 34.

Figure 4:
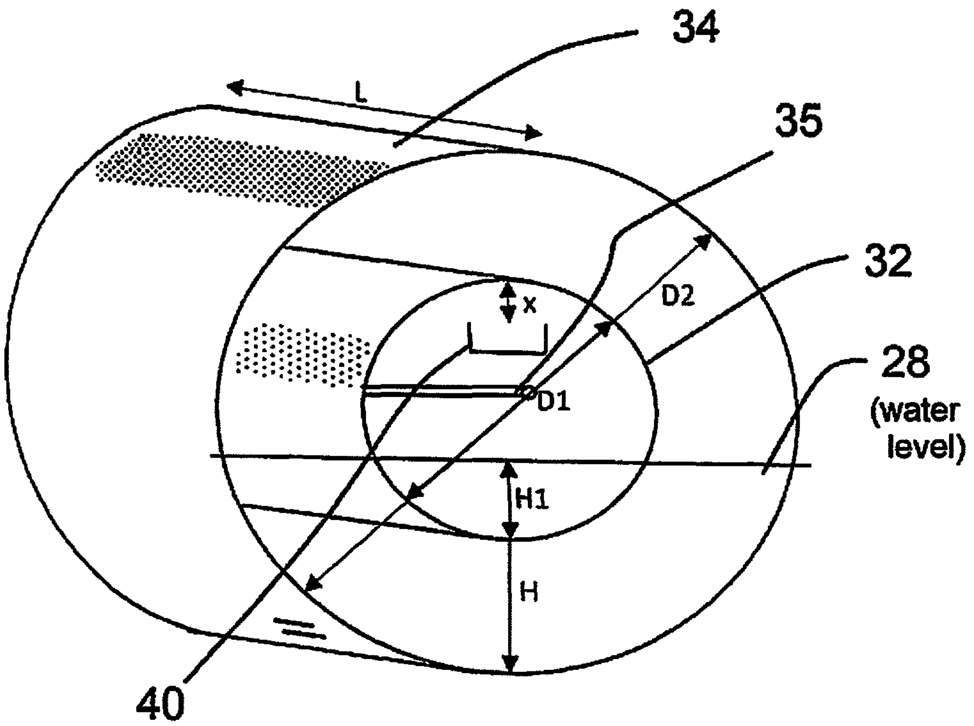
FIG. 4 is a schematic view with an example of dimensions of a concentric dual drum screen system of the invention.

The two drums rotate together on a central horizontal shaft indicated schematically in FIG. 4, with appropriate struts or framework supporting the two drums for rotation.

An inlet for wastewater is shown at 36, through the tank wall and an additional inner wall, if included. The inlet can be a simple opening into the interior 32*a* of the inner drum screen cylinder, admitting liquid into that interior. As shown, screening lifts 38 are included, for catching debris as the liquid filters through the inner screen. These are essentially shallow ledges or shelves as in a typical drum screen, fixed to the framework of the drum or to the screen.

At or near the top of the interior 32*a* at the inner screen 32 is a screening collection hopper 40, which can be of conventional construction. A spray wash system includes sprayers 42 just above the drum screen and directly above the collection hopper 40, for washing debris collected on the inner side of the screen down into the hopper, for removal out one end of the apparatus 26, in a manner typical of drum screens.

The filtrate exiting the inner drum screen 32 enters a space 42 between the two drums 32 and 34. From there, the liquid progresses out through the outer screen 34*a* for discharging into the tank 25. Again, the outer screen includes a screening collection hopper 44 positioned generally centrally, and a set of sprayers 46 to wash collected debris down into the hopper 44, from the inner side of the screen 34*a*. Like the inner drum 32, the outer drum includes screening lifts 48, a plurality of them running longitudinally along the inner side of the screen. These help bring the collected debris up to a position to be washed down into the collection hopper 44.

An outlet for the filtrate that has passed through the dual filter screens is shown at 50.

FIG. 4 schematically shows the inner and outer screens 32 and 34 indicating a set of dimensions for a preferred embodiment. As indicated, the inner drum can have an inner diameter D1 of about 36 inches, or a range of about two feet to four feet. The outer drum 34 can have an inner diameter D2 of about 60 inches, or a range of about four feet to six feet. The length L in a preferred embodiment no greater than two-thirds of D2, the outer drum diameter; this can also vary, as needed. The distance X from the top of the inner screen down to the collection tray or hopper 40 in a preferred embodiment is about six inches, or a range of about four inches to eight inches. The upper collection tray 44 can be positioned similarly. The dimension H from the outer drum at bottom up to the water level 28 in this embodiment is about 30 inches, or a range of about 24 to 36 inches. The dimension H1 (included in H) indicates the depth of wastewater within the inner drum, which can be about 18 inches (about half the inner drum's diameter), or a range of about 16 to 24 inches.

For reasons noted above, the outer drum's wetted area should be greater than that of the inner drum, since the outer drum has smaller screen openings. Given the preferred dimensions above, the wetted area of the smaller, inner drum will be about 2375 square inches, while the wetted area of the larger, outer drum will be about 3958 square inches. This produces a ratio of 1.67 between wetted areas of outer and inner drums. If the design liquid level is lowered, this ratio would become greater. The ratio is minimized when H is equal to D2/2, i.e. the liquid depth is at the center of rotation of the drums. This is a preferred ratio for operation when the screen sizes of the inner and outer screens are 6 mm and 0.5 mm respectively. However, other screen sizes and wetted area ratios can be employed, and in another embodiment, preferred screen sizes are 3 mm and 1 mm, respectively, or ranges of about 2-6 mm and 0.5-1.5 mm, respectively.

Figure 5:
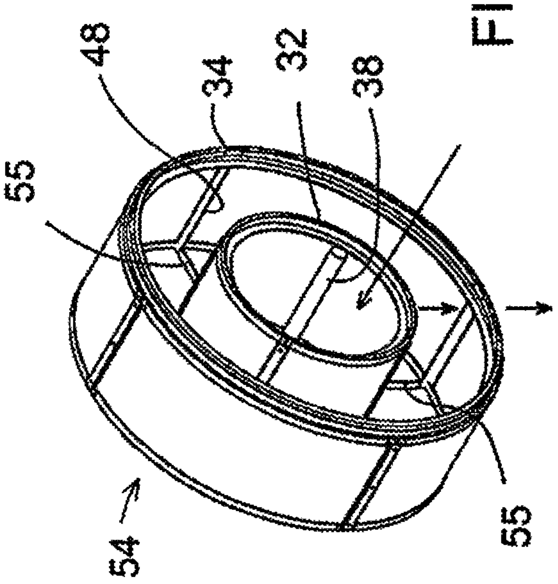
FIG. 5 is a perspective view showing the dual drums.

FIG. 5 shows the inner and outer drums 32 and 34, structured as one unit 54 and connected by radial struts 55. The screening lifts 38 and 48 are also seen in this view.

Figure 7:
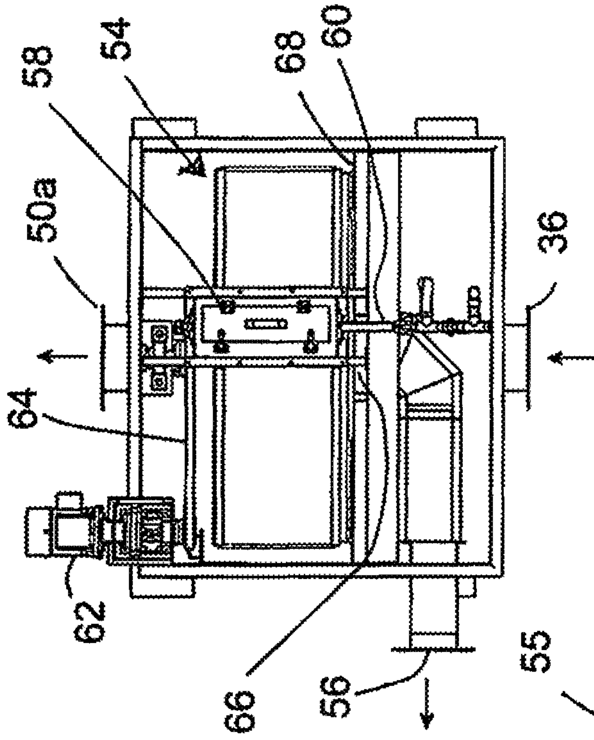
FIG. 7 is a plan view, partially broken away, of the embodiment of FIG. 6.
Figure 6:
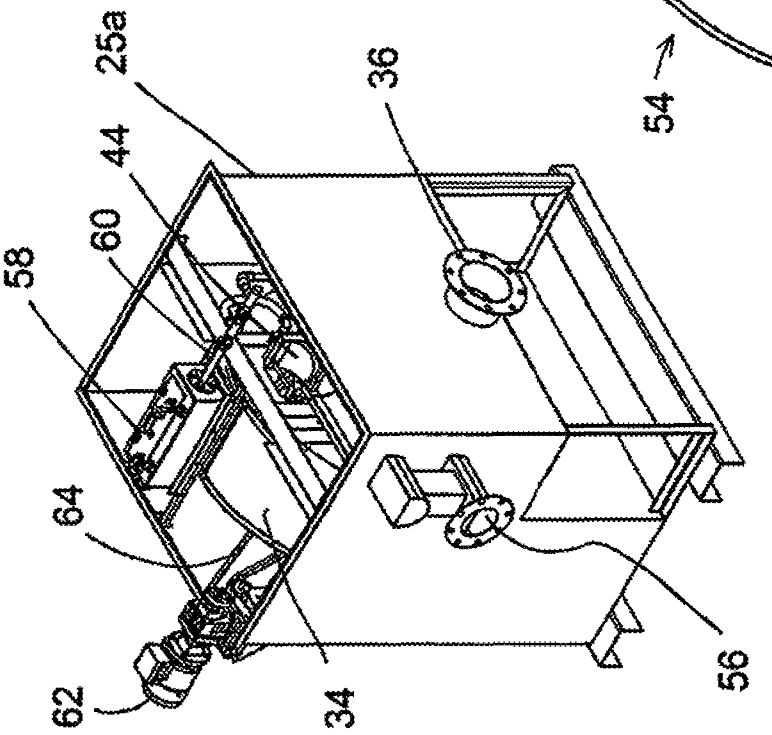
FIG. 6 is a perspective view showing another preferred embodiment.

FIG. 6 through 9 show a similar but slightly modified embodiment. The dual screen system as shown in FIG. 6, with a tank 25*a*, reveals some of the inner components, the top being removed. The inlet 36 is at front as in the other embodiment, but the tank outlet 50*a* is at rear as shown in FIG. 7.

Further details of the debris removal system are shown in FIGS. 6 through 9. A hopper discharge outlet is shown at 56, and the upper hopper is seen in this view at 44. A spray header box 58 is positioned above the outer, larger drum screen 34, with piping 60 leading into the spray header box. At 62 is shown a motor drive assembly, including a belt or chain shown at 64 connected to rotate the dual drum assembly 54. These components are also shown in FIG. 7, the plan view. FIG. 7 also shows the inlet 36 leading through an internal conduit 66 to the interior of the inner drum screen, and a plate or wall 68 sealing against the front of the drum screens. The inlet conduit 66 passes through that plate.

Figure 8:
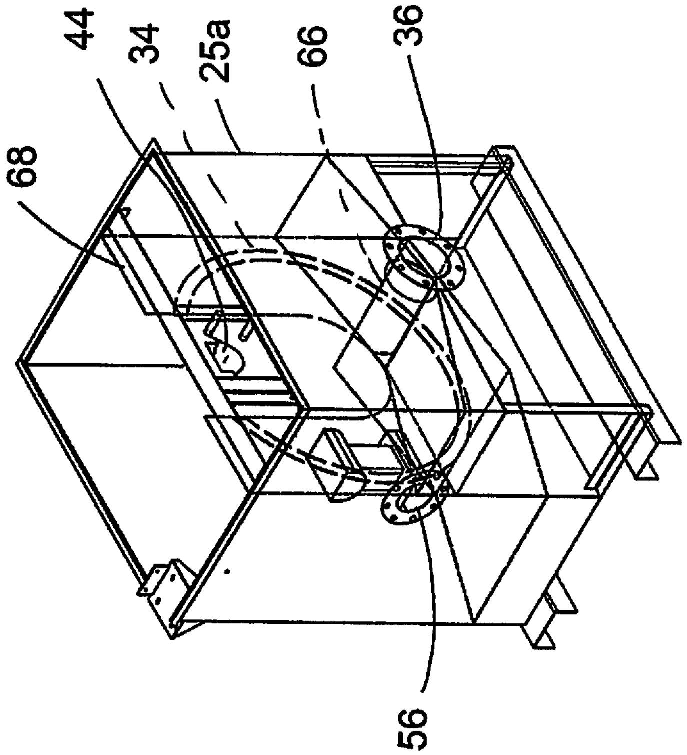
FIG. 8 is a perspective view, with internal components revealed, of the embodiment of FIG. 6.
Figure 9:
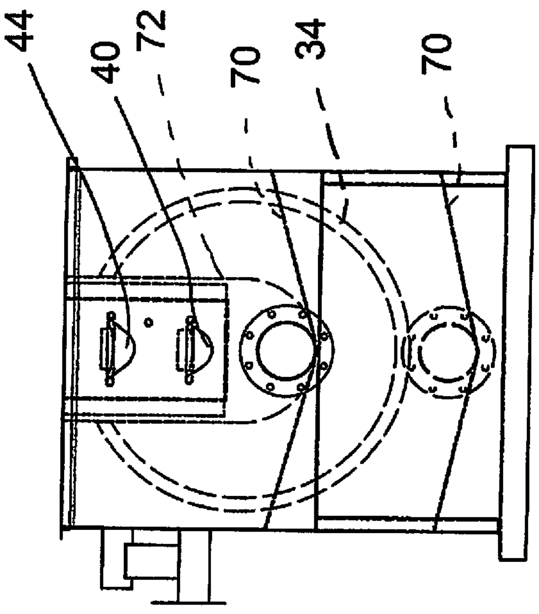
FIG. 9 is a front elevation view showing the embodiment of FIG. 6.

FIGS. 8 and 9 have further depictions of the interior components of the tank 25*a*.

In FIG. 8 a portion of the outer drum 34 is shown in dashed lines, as is the inlet conduit 66. The upper hopper is visible at 44, and the hopper discharge outlet is seen at 56. In this view the lower hopper is not seen. As described above, the outlet of filtered liquid from the tank 25*a* is at the rear. V-shaped plates 70 seen dashed in FIG. 9 collect water and debris at a central point for discharge.

In FIG. 9 both the lower and upper debris hoppers 40 and 44 are seen, with much of the internal structure being shown in dashed lines. The outer drum screen 34 is indicated, with the upper hopper 44 in position to receive debris from the drum screen 34 as it reaches its high point. The inner drum screen is not shown in this view. A U-shaped structure seen at 72 in FIGS. 8 and 9 is a cutout in the tank dividing wall 68, where a sluice trough (not shown) penetrates the dividing wall. One end of the trough connects to the stationary hopper that is cantilevered in each drum. The hopper is located just under the spray wash so it can collect the washwater and high concentrations of solids from the inner and outer drum. The trough takes this mixture as a combination from both hoppers and transports it by gravity outside of the tank, preferably to a screw compactor (not shown).

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A concentric dual drum screen filtration assembly, comprising:

two concentric cylindrical drum screens, including a first, inner drum screen within a second, outer drum screen, a common substantially horizontal support shaft connected to both the drum screens and supporting the drum screens for concentric rotation about a substantially horizontal axis, the inner drum screen being of a first screen mesh size, and the outer drum screen being of a second screen mesh size smaller than the first screen mesh size, a liquid inlet into an interior space of the inner drum screen, defining a liquid flow path outward through the inner drum screen and into an interior annular space between the inner and outer drum screens, such that liquid flows first through the inner drum screen and then outward through the outer drum screen, and a debris removal system including a water spray sprayer external to each drum screen directing a water spray inwardly toward the screens, and a collection hopper in the interior of each drum screen positioned to collect debris falling off the screens as induced by the water spray.

2. The drum filtration assembly of claim 1, wherein the first screen mesh size has opening size of about 6 mm.

3. The drum filtration assembly of claim 1, wherein the second screen mesh size with has opening size of about 0.5 mm.

4. The drum filtration assembly of claim 1, wherein the first, inner drum screen has an inner diameter in the range of about two feet to four feet, and the second, outer drum screen has an inner diameter in the range of about four feet to six feet.

5. The drum filtration assembly of claim 4, wherein the support shaft is a driving shaft for the inner and outer drum screens.

6. The drum filtration assembly of claim 1, wherein the debris removal system comprises the sole means of removing debris from the drums screens during operation.

7. The drum filtration assembly of claim 1, wherein the assembly includes a housing within which the inner and outer drum screens are positioned, the housing having said liquid inlet and an outlet for filtrate, as well as a debris removal outlet for debris collected in the collection hoppers.

8. The drum filtration assembly of claim 1, wherein during operation of the assembly the outer drum has a wetted area about 1.67 times the wetted area of the inner drum.

9. The drum filtration assembly of claim 7, wherein the first, inner drum screen has an inner diameter in the range of about two feet to four feet, and the second, outer drum screen has an inner diameter in the range of about four feet to six feet, and wherein the distance from the bottom of the outer drum up to water level in the housing during operation is about 30 inches, or in the range of about 24 to 36 inches.

* * * * *